United States Patent Office 2,699,410
Patented Jan. 11, 1955

2,699,410

TREATMENT OF TEXTILE MATERIALS

Harold Garton Emblem, Lancashire, England, assignor, by mesne assignments, to Monsanto Chemicals Limited, London, England, a British company No Drawing. Application January 31, 1950,
Serial No. 141,593

Claims priority, application Great Britain
February 4, 1949

8 Claims. (Cl. 117—139.5)

This invention relates to the treatment of textile materials in order to reduce the tendency of the fibers to slip on each other. The treatment of the invention may for instance be applied to textile fibers in bulk, to slivers of various types or yarns, or to fabrics themselves.

It is well known that the tendency of textile fibers to slip on each other is one of the causes of lack of strength in yarns and fabrics, and if this tendency can be reduced a product of increased strength can be obtained. This is especially true when certain artificial fibers are in question, owing to the smooth surface that such fibers frequently present.

The present invention is concerned with a method of improving textile materials in this respect by treating them with organic silicates. The organic silicates, among the most important of which are the ethyl silicates (that is to say ethyl orthosilicate and its partially hydrolyzed and thus polymeric derivatives), are water-insoluble compounds which can readily be hydrolyzed by water to yield silicic acid. Gels can for instance be formed in this way. Thus an alcoholic solution of ethyl orthosilicate of an appropriate concentration and containing sufficient water will slowly solidify to a gel, and this can be accelerated by incorporating in the solution as condensing agent an organic base having a pKa value above 7.8. The use of such organic bases is described in British specifications Nos. 575,752 and 612,622. In a similar way, if ethyl orthosilicate is emulsified with water and the emulsion is allowed to stand, the orthosilicate will slowly hydrolyze, and here again the hydrolysis can be accelerated by the condensing agents mentioned above. The production of such emulsions is described in British specification No. 5,754/47, now British Patent No. 641,553. Similar results are obtained if instead of using ethyl orthosilicate itself a partially hydrolyzed polymeric derivative is used, as might be obtained by the reaction of silicon tetrachloride with ethyl alcohol containing a proportion of water, and in fact the same types of effect are obtained with organic silicates in general, including both alkyl and aryl silicates (such as tetracresyl silicate).

It has now been found that if textile materials are treated with an aqueous emulsion of an organic silicate and the emulsion (or its gel, if the emulsion has gelled in contact with the materials) is then allowed to dry on the materials, there is a considerable reduction in the tendency of the fibers to slip on each other, and textile products containing such fibers are of considerably increased strength. It might be supposed that the operation involves the hydrolysis of the silicate and even the conversion of the consequent silicic acid to silica on drying. Clearly the emulsion must be applied before there has been time for hydrolysis and gelation to take place to such an extent that the fluid character is lost, but be this as it may, it is suspected that in some instances at least silica is formed which is in some way made substantive to the fibers and attaches itself quite firmly. Thus it is frequently found that the effect is largely resistant to laundering.

There are a wide range of emulsions which are suitable, some of which are of the water-in-silicate type, and others of the silicate-in-water type depending on their method of production. The emulsions can readily be formed by agitating the silicate with water in a convenient manner, in practice in the presence of a dispersing agent of some kind, for instance by stirring or by using a Hatschek or other emulsifier. Among suitable emulsions there may be mentioned the following types:

1. An emulsion of the organic silicate with water prepared using monoethanolamine or other amine emulsifying agent. Monoethanolamine is also a condensing agent having the effect mentioned above.

2. An emulsion of the organic silicate with water prepared in the presence of butyl laurate (an emulsion of the water-in-silicate type).

3. An emulsion of the organic silicate with water prepared in the presence of a protective colloid such as (a) sodium alginate (examples of such emulsions, which can be either of the water-in-silicate or silicate-in-water type, are described in British specification No. 5,754/47, now British Patent No. 641,553), or (b) casein (emulsions of this type have been found to give especially satisfactory results resistant to laundering; they are usually of the silicate-in-water type and can consequently be readily diluted with water if required).

It is as indicated above sometimes useful to have present as condensing agent an organic base having a pKa value above 7.8, as described for instance in British specifications Nos. 575,752 and 612,622, and the production of suitable emulsions containing these is described in the examples given later in this specification. Piperidine and dicyclohexylamine can be mentioned as suitable organic bases.

The emulsion is applied to the textile materials in any convenient manner, and may be applied to the fibers before spinning them into yarn, or to the fibers while being formed into yarn, or to the yarn itself. It may if desired be applied to the formed fabric, and this has in fact been found a most satisfactory method of utilizing the invention. Any type of textile fiber is amenable to the treatment, including wool, cotton and artificial fibers. In the particular instance of nylon, it has been found in some instances where an emulsion has ben applied to nylon fabric according to the invention that the slip resistance has been increased from about 16 pounds to over 35 pounds.

A fabric can be treated simply by immersing it in the emulsion and drying, though various other methods of operation will be apparent to those conversant with textile processing.

The invention is illustrated by the following examples, of which Nos. 1 to 3 describe the production of the emulsions, and No. 4 describes their use. It will be appreciated that the emulsions must be used before they become too thick, or even solid, owing to gelling.

Example 1

To a solution of 0.15 gram of sodium alginate in 50 ml. of water there were added 50 ml. of an ethyl silicate prepared by the action of silicon tetrachloride on ethyl alcohol containing about 6% of water, and accordingly a partially hydrolyzed and polymerized ester. The addition was made by means of a Hatschek emulsifier of the type described by Clayton ("Emulsions and their Technical Treatment," 1943, page 332). A good emulsion was thereby formed.

In this example there was incorporated in the ethyl silicate 2% by volume of the condensing agent piperidine, though this was not essential.

The precise type of emulsion obtained using sodium alignate depends on the conditions. Thus the emulsion described in this example is a silicate-in-water emulsion. If the alginate solution is added to the silicate, instead of vice versa, a water-in-silicate emulsion is obtained which gels in about 20 minutes, and this also is suitable for use according to the invention. It must of course be used sufficiently before this time has elapsed for the emulsion to be adequately fluid.

Example 2

One hundred ml. of water were stirred into a mixture of 60 ml. of a silicate of the type described in Example 1 (but free from piperidine) and 40 ml. of butyl laurate, the period of stirring being 5 minutes.

A satisfactory emulsion was obtained, which gradually increased in viscosity, becoming a stiff cream in 24 hours and a paste in 48 hours.

Example 3

A casein dispersion was produced of the following composition:

| | | |
|---|---|---|
| Water | ml | 300 |
| Diethanolamine | ml | 10 |
| Triethanolamine oleate | gr | 5 |
| "Water-soluble" casein | gr | 15 |

Eighty ml. of the dispersion were emulsified with 20 ml. of a silicate of the type described in Example 1 (but free from piperidine) by stirring for 5 minutes.

The emulsion could be diluted with water, and was of the silicate-in-water variety. On standing, some settling of the emulsified material took place, but if the time of standing was not too long it could be redispersed by agitation.

Example 4

A series of three tests was carried out in each of which a sample of nylon fabric approximately 3 inches by 2 inches was immersed in one of the emulsions of Examples 1 to 3, and was then dried at 100° C. for 10 minutes, washed with soap in hot running water for 5 minutes, and then rinsed in hot water and dried at 100° C. The drying was carried out in a laboratory oven fitted with a fan.

In each of the three instances the slip resistance of the fabric was increased, and the results given below are to be noted. It is observed that the test, entailing as it did a treatment analogous to laundering, was also a measure of the resistance of the effect to laundering.

| | Slip resistance, pounds |
|---|---|
| Original fabric | 16 |
| After treatment with an emulsion as prepared in Example 2, the emulsion being 15 minutes old | 37 |
| After treatment with an emulsion as prepared in Example 3, the emulsion being 21 hours old | 37 |

What is claimed is:

1. A process for the treatment of textile materials in order to reduce the tendency of the fibers present therein to slip on each other which comprises treating the materials with an aqueous emulsion consisting of water, an emulsifier, an organic silicate selected from the group consisting of tetra alkyl orthosilicates and tetra aryl orthosilicates and a protective colloid selected from the group consisting of sodium alginate and casein, and then allowing the emulsion to dry on said materials.

2. A process according to claim 1 in which said textile materials are textile fabrics.

3. A process for the treatment of textile fabrics in order to reduce the tendency of the fibers present therein to slip on each other which comprises treating said fabrics with an aqueous emulsion consisting of water, an emulsifier, tetra ethyl orthosilicate and sodium alginate, and then allowing the emulsion to dry thereon.

4. A process for the treatment of textile fabric in order to reduce the tendency of the fibers present to slip on each other which comprises treating said fabric with an aqueous emulsion consisting of water, an emulsifier, tetra ethyl orthosilicate and casein, and then allowing the emulsion to dry on the fabric.

5. A process for the treatment of textile materials in order to reduce the tendency of fibers present therein to slip on each other which comprises treating the materials with an aqueous emulsion consisting of water, an emulsifier, an organic silicate selected from the group consisting of tetra alkyl orthosilicates and tetra aryl orthosilicates, a protective colloid selected from the group consisting of sodium alginate and casein and an organic base having a pKa value above 7.8, and then allowing the emulsion to dry on the materials.

6. A process according to claim 5 but further characterized in that said materials are textile fabrics.

7. A process for the treatment of textile fabric in order to reduce the tendency of the fibers present therein to slip on each other which comprises treating said fabric with an aqueous emulsion consisting of water, an emulsifier, sodium alginate, tetra ethyl orthosilicate and an organic base having a pKa value above 7.8, and then allowing the emulsion to dry on the fabric.

8. A process for the treatment of textile fabric in order to reduce the tendency of the fibers present therein to slip on each other which comprises treating said fabric with an aqueous emulsion consisting of water, an emulsifier, casein, tetra ethyl orthosilicate and an organic base having a pKa value above 7.8, and then allowing the emulsion to dry on the fabric.

References Cited in the file of this patent

UNITED STATES PATENTS

| Number | Name | Date |
|---|---|---|
| 1,809,755 | King et al. | June 9, 1931 |
| 2,058,844 | Vaughn | Oct. 27, 1936 |
| 2,410,382 | Kaplan | Oct. 29, 1946 |
| 2,443,512 | Powers et al. | June 15, 1948 |
| 2,480,949 | Morison | Sept. 6, 1949 |
| 2,527,329 | Powers et al. | Oct. 24, 1950 |
| 2,550,923 | Hackford | May 1, 1951 |

OTHER REFERENCES

King: Journal of Oil Colour Chemists' Association, vol. 13, No. 116, February 1930, pp. 45–47.